United States Patent [19]

Hirasawa

[11] Patent Number: 4,985,781

[45] Date of Patent: Jan. 15, 1991

[54] RECORDING AND/OR REPRODUCING APPARATUS IN WHICH A REFERENCE SIGNAL IS USED IN A RECORDING AND/OR REPRODUCING PART AS WELL AS IN ANOTHER PART

[75] Inventor: Masahide Hirasawa, Kanagawa, Japan

[73] Assignee: Canon Kabushiki Kaisha, Tokyo, Japan

[21] Appl. No.: 478,048

[22] Filed: Feb. 7, 1990

Related U.S. Application Data

[63] Continuation of Ser. No. 34,831, Apr. 6, 1987, abandoned.

[30] Foreign Application Priority Data

Apr. 15, 1986 [JP] Japan .................................. 61-85085

[51] Int. Cl.$^5$ .............................................. H04N 9/80
[52] U.S. Cl. .................................... 358/324; 358/310; 358/906
[58] Field of Search ................. 358/310, 320, 323–327, 358/330, 335, 337, 906, 909, 213.11, 56, 64; 360/33.1

[56] References Cited

U.S. PATENT DOCUMENTS

| | | | |
|---|---|---|---|
| 4,077,046 | 2/1978 | Morio .................................. | 358/324 |
| 4,100,567 | 7/1978 | Yoshinaka ........................... | 358/324 |
| 4,163,247 | 7/1979 | Bock et al. ......................... | 358/310 X |
| 4,277,796 | 7/1981 | Ross .................................... | 358/324 X |
| 4,500,930 | 2/1985 | Hamalainen et al. ............. | 358/324 X |
| 4,555,735 | 11/1985 | Usuki et al. ....................... | 358/310 X |
| 4,613,909 | 9/1986 | Tobe ................................... | 358/310 |
| 4,670,772 | 6/1987 | Bolger ................................ | 358/64 X |
| 4,725,894 | 2/1988 | Sasaki et al. ....................... | 358/310 |
| 4,730,222 | 3/1988 | Schauffele ......................... | 358/310 |
| 4,754,340 | 6/1988 | Nakagawa et al. ............... | 358/310 X |

Primary Examiner—Aristotelis M. Psitos
Assistant Examiner—W. R. Young
Attorney, Agent, or Firm—Robin, Blecker, Daley & Driscoll

[57] ABSTRACT

A color video signal recording and/or reproducing apparatus wherein a reference signal which has a frequency related to a color subcarrier frequency of a carrier chrominance signal included in a color video signal and is used by a carrier chrominance signal processing circuit disposed within a video signal recording and/or reproducing part is arranged to be usable also by a signal processing circuit which is arranged to process the carrier chrominance signal within another part which is functionally coupled with the recording and/or reproducing part and is arranged to perform a function other than recording and reproduction.

5 Claims, 3 Drawing Sheets

RECORDING AND/OR REPRODUCING APPARATUS IN WHICH A REFERENCE SIGNAL IS USED IN A RECORDING AND/OR REPRODUCING PART AS WELL AS IN ANOTHER PART

This application is a continuation of U.S. application Ser. No. 034,831, filed Apr. 6, 1987.

BACKGROUND OF THE INVENTION

1. Field of the Invention

This invention relates to a color video signal recording and/or reproducing apparatus and more particularly to an apparatus having a color video signal recording and/or reproducing part and a part which is functionally coupled with the recording and/or reproducing part and is arranged to perform functions other than recording and reproduction.

2. Description of the Related Art

Video tape recorders (VTRs) of the type called a camera-combined VTR have recently become popular. Reduction in size and weight of VTRs of this type is being rapidly furthered. Following this trend, the technology for consolidating the peripheral video devices into a camera-combined VTR has advanced and commercialized. The basic structural arrangement of this consolidated devices is virtually the same as an arrangement to place a VTR within one and the same casing together with such peripheral devices as a video camera.

The present applicant has previously proposed a camera-combined VTR, wherein delay means is provided for use by both a camera part and a recording/reproducing part and a driving block is arranged to drive both the image sensor of the camera part and the delay line of the recording/reproducing part, as disclosed in U.S. patent application Ser. No. 452,501 and U.S. Pat. 4,613,209, (Inventor: K. Tobe). In this instance, an oscillator which is provided within a carrier chrominance signal processing circuit for producing a reference signal of frequency related to color subcarrier frequency is arranged to serve for both the peripheral device and the VTR.

Generally, a chrominance signal processing circuit which handles a carrier chrominance signal is arranged to process the carrier chrominance signal by using a reference signal related to a color subcarrier frequency (herein after referred to as fsc). This reference signal must have its phase very accurately defined because it serves as reference for the hue of the carrier chrominance signal.

The conventional camera-combined VTR or the like is arranged to have two oscillators for the reference signal fsc. However, due to a difference in temperature characteristic or the like, the two reference signals obtained by these oscillators come to differ from each other in frequency and phase. Therefore, it has sometimes been impossible to accurately process a chrominance signal and the chrominance signal detecting circuit of the conventional camera-combined VTR thus has been apt to make a faulty operation.

SUMMARY OF THE INVENTION

It is a general object of this invention to solve the above stated problem of the prior art.

It is a more specific object of this invention to provide a color video signal recording and/or reproducing apparatus which permits reduction in the number of reference signal generating circuits.

It is another object of this invention to provide a color video signal recording and/or reproducing apparatus which is capable of performing an adequate signal processing operation by matching a plurality of carrier chrominance signal processing circuits.

Under this object, a color video signal recording and/or reproducing apparatus arranged according to this invention comprises: a recording and/or reproducing part which records and/or reproduces a color video signal, the part including a first signal processing circuit for processing the carrier chrominance signal included in the color video signal; a coupled part which is functionally coupled with the recording and/or reproducing part and performs a function other than recording and reproduction, the coupled part including a second signal processing circuit for processing the carrier chrominance signal included in the color video signal; and reference signal generating means for providing the first and second signal processing circuits with a reference signal having a frequency related to a color subcarrier frequency of the carrier chrominance signal.

These and other objects and features of this invention will become apparent from the following detailed description of embodiments thereof taken in connection with the accompanying drawings.

DETAILED DESCRIPTION OF PREFERRED EMBODIMENTS

Figure 1:
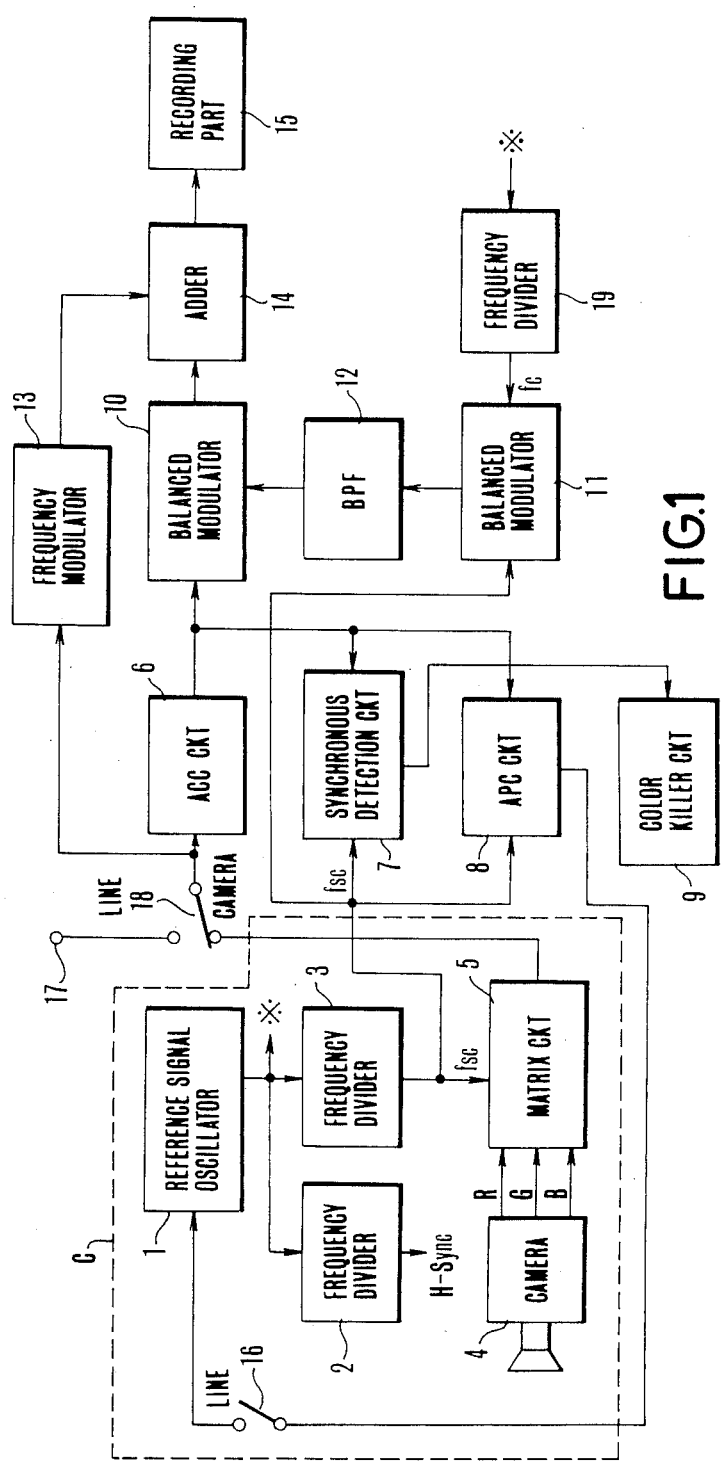
FIG. 1 is a block diagram showing the arrangement of essential parts of a camera-combined type VTR embodying this invention.

FIG. 1 shows the essential parts of a VTR of the camera-combined type arranged as an embodiment of this invention. Referring to FIG. 1, a reference signal oscillate 1 is arranged to oscillates at a frequency which is n times as high as a color subcarrier frequency nfsc. A frequency divider 2 is arranged to divide the frequency fsc and to produce a clock signal of a horizontal synchronizing signal frequency fH. A frequency divider 3 is arranged to divide the oscillation frequency nfsc of the reference signal oscillator 1 by 1/n and to produce a reference signal of the frequency fsc. The illustration includes a video camera 4; a matrix circuit 5 which is arranged to obtain a luminance signal and color difference signals from three chrominance signals R, G and B produced from the video camera 4 and to produce a composite video signal consisting of the luminance signal and the chrominance signals by forming a carrier chrominance signal through a quadrature two phase modulation process performed on the color difference signal; an automatic chrominance signal gain control (ACC) circuit 6; a synchronous detection circuit 7; a known automatic phase control (APC) circuit 8; a color killer circuit 9; balanced modulators 10 and 11; a bandpass filter (BPF) 12; a frequency modulator 13; an adder 14; and a recording part 15 of the VTR.

In recording a video signal obtained by the camera, an image pickup part C which is encompassed with a broken line is arranged to frequency divide the output of the reference signal oscillator 1 which oscillates at the frequency nfsc to form two reference signals composed of a reference frequency. In other words, the part C forms reference signals for a horizontal synchronizing signal and the color subcarrier frequency fsc.

The matrix circuit 5 is not a matrix circuit in a narrow sense of the word and is arranged to produce a composite video signal as mentioned in the foregoing. The chrominance signal included in this composite video signal is obtained by a quadrature two-phase modulation process carried out with the reference signal of the frequency fsc produced by the frequency divider 3. Therefore, the burst signal included in this chrominance signal is in phase with the above state reference signal of the frequency fsc.

Generally, conversion of a chrominance signal into a lower band chrominance signal through a balanced modulation process is carried out in a VTR by using a continuous wave of the color subcarrier frequency fsc which is synchronized with this burst signal. In other words, the reference signal of the color subcarrier frequency fsc which is used for the quadrature two-phase modulation process at the matrix circuit 5 of the camera part is supplied as it is to the balanced modulator 11 to form thereby a converting signal to be supplied to the low band converting balanced modulator 10. This arrangement gives no problem but rather ensures that the signal thus obtained is more accurately synchronized than a continuous wave of the frequency fsc formed within the VTR, because the signal is the same as the color subcarrier of the chrominance signal obtained from the matrix circuit 5.

The balanced modulator 11 receives at its other input terminal a reference signal for the frequency fc of a chrominance signal obtained through the low band converting process. The frequency component (fc+c) of the output signal of the balanced modulator 11 is separated at the band-pass filter 12. The output of the filter 12 is supplied to the balanced modulator 10. The modulator 10 then gives a chrominance signal which has been frequency converted into the frequency fc. The above stated reference signal of the frequency fc is obtained by frequency dividing the output signal of the oscillator 1 by the frequency divider 19.

With the color subcarrier to be used at the camera part thus supplied in the above stated manner to the balanced modulator 11 which is on the side of the recorder, this arrangement obviates the necessity of any voltage controlled oscillator (VCO) that is arranged to have the output thereof synchronized with the burst signal and used for the balanced modulator 11. In other words, in accordance with the above stated arrangement of this embodiment, it is not necessary to arrange an APC loop including the VCO before the balanced modulator 11 in making the phase of the chrominance signal coincide with that of the burst signal. Further, since the phase of the chrominance signal carrier wave and that of the converting signal are completely coinciding with each other, deterioration of hue never occurs.

The synchronous detection circuit 7 is arranged to cause the color killer circuit 9 to operate on the basis of a phase difference between the color burst signal included in the chrominance signal obtained via the ACC circuit 6 and the output signal of the frequency divider 3. The circuit 7 is mainly used for recording an external video signal, i.e. in the event of a so-called line input. In the case of a camera input, since the burst signal is of the same phase as the reference signal produced from the frequency divider 3, the embodiment automatically assumes a color mode without operating the color killer circuit 9.

Meanwhile, the luminance signal in the composite video signal obtained via a switch 18 is frequency modulated by the frequency modulator 13 an is frequency multiplexed at the adder 14 with the chrominance signal which has been converted into a lower band. The video signal which is frequency multiplexed by the adder 14 is gradually recorded in helical tracks in a known manner on a magnetic tape by means of the recording part 15 of the VTR.

In the event of recording a composite video signal coming via an external input terminal 17, such as a composite video signal obtained from a television tuner, instead of recording the composite video signal produced from the image pickup part C, the embodiment operates as follows: In this instance, the above stated reference signal oscillator 1 is used as the voltage controlled oscillator VCO. In converting the chrominance signal into a low band signal, a continuous wave signal which is in synchronism with the color burst signal must be used as mentioned in the foregoing. Therefore, unlike in the case of the camera input, the external line input necessitates preparation of the continuous wave of this color subcarrier on the side of the VTR. To meet this requirement, the following processes are performed:

At the APC circuit 8, the phase of the reference signal of the same frequency fsc as that of the color subcarrier which is obtained by frequency dividing the output of the reference signal oscillator 1 by the frequency divider 3 is compared with that of the burst signal included in the chrominance signal procuded from the ACC3 circuit 6. An error signal voltage resulting from this phase comparison is fed back to the reference signal oscillator 1 to synchronize thereby the phase of the output signal of the reference signal oscillator 1 with that of the burst signal. The reference signal of the color subcarrier frequency fsc thus obtained is supplied to the balanced modulator 11. The synchronous detection circuit 7 and the color killer circuit 9 can be operated also by means of this signal.

In reproducing a recorded video signal, the chrominance signal can be brought back to the original frequency in the same manner as the conventional VTR by using the reference signal oscillator 1 as a reference signal oscillator operating at a fixed frequency. In this instance, time base correction is to be accomplished in the same manner as in the conventional apparatus.

Figure 2:
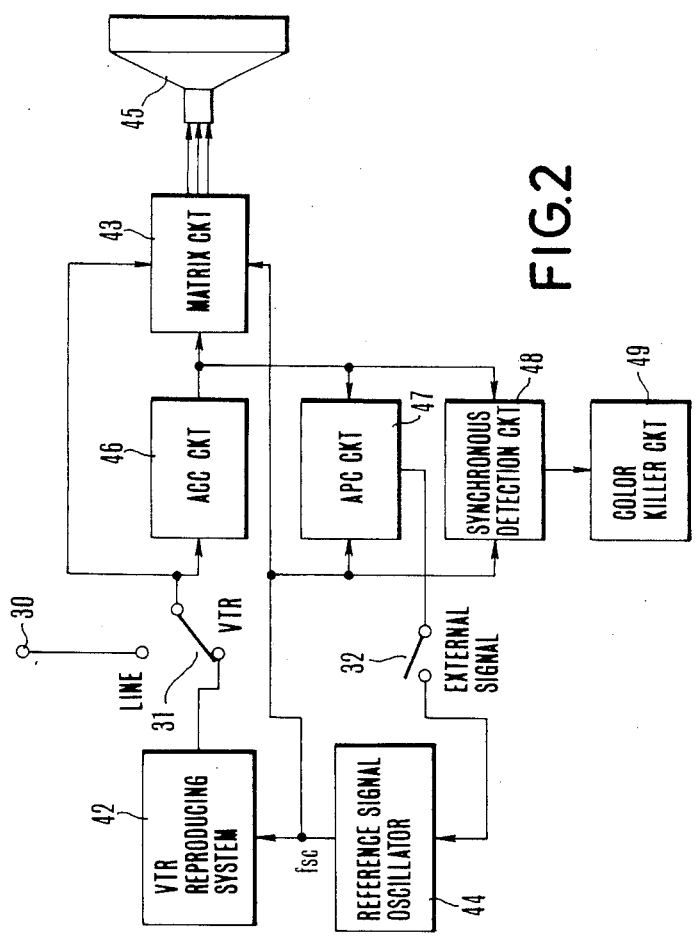
FIG. 2 is a block diagram showing in outline the arrangement of essential parts of a display device-combined type VTR arranged as another embodiment of this invention.

FIG. 2 shows in outline the arrangement of another embodiment in which this invention is applied to a case where a monitor device is arranged in one unified body with a VTR. The illustration includes a reproduction system 42 of the VTR; a matrix circuit 43 which is arranged to perform conversion into signals R, G and B with color difference signal obtained by demodulating the chrominance signal and the luminance signal. A reference signal oscillator 44 is arranged to produce a reference signal of the color subcarrier frequency fsc. A reference numeral 45 denotes a picture tube.

In producing a composite video signal reproduced by the reproduction system 42 of the VTR on the picture tube 45, the reference signal oscillator 44 operates as a fixed reference signal oscillator. The phase of the burst signal of a chrominance signal reproduced by the VTR is arranged to become equal to that of the output signal of the reference signal oscillator 44 as will be described later. Since a continuous wave which is synchronized with the phase of the burst signal is necessary for color demodulation at the matrix circuit 43, the output of the reference signal oscillator 44 can be used as it is. Meanwhile, the synchronous detection circuit 48, the APC circuit 47 and the color killer circuit 49 do not have to be operated.

Figure 3:
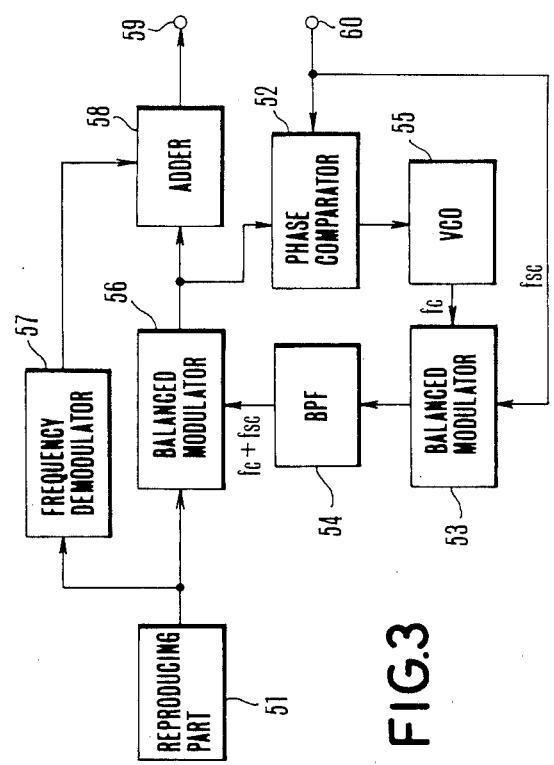
FIG. 3 is a diagram showing the details of the reproduction system of the VTR shown in FIG. 2.

FIG. 3 shows the arrangement of the reproduction system of the VTR shown in FIG. 2. The luminance signal included in a video signal reproduced at a reproduction part 51 is demodulated by a frequency demodulator 57. The demodulated luminance signal is supplied to an adder 58. Meanwhile, the chrominance signal is frequency converted to its original frequency and time base correction is carried out at a balanced modulator 56.

The operation of this balanced modulator 56 is briefly described as follows: The phase of a color burst signal included in the chrominance signal produced from the balanced modulator 56 is compared at a phase comparator 52 with the reference signal which is produced from the oscillator 44 of FIG. 2 and is supplied via a terminal 60. The comparator 52 produces an error voltage in proportion to a phase difference between these signals. The error voltage is supplied to a voltage controlled oscillator (VCO) 55. The center frequency of this VCO 55 is the carrier frequency fc of the low-band converted chrominance signal. The output of the VCO 55 includes a time base varying component. The output signal of the VCO 55 and the reference signal coming via the terminal 60 are supplied to a balanced modulator 53. A component (fc+fsc) is taken out from the output signal of this balanced modulator 53 by means of a band-pass filter (BPF) 54. The output signal of this BPF 54 is supplied as converting signal to be used at the balanced modulator 56. The reproduced chrominance signal is thus brought back to its original band. Further, the output of the BPF 54 contains a time base varying component similar to that of the reproduced chrominance signal. As a result, no time base varying component is included in the signal which is obtained through the balanced modulation.

An adder 58 is arranged to add the chrominance signal brought back to its original band and the luminance signal. A composite video signal thus obtained is produced from a terminal 59. The video signal is then produced via one terminal of a switch 31 on the side of the VTR. The chrominance signal component of the video signal is supplied to the ACC circuit 46. At the matrix circuit 43, R, G and B signals are obtained using the luminance signal and two color difference signals which are obtained and produced from the ACC circuit 46 by chrominance demodulating the chrominance signal. The R, G and B signals thus obtained are supplied to the picture tube 45.

In case that a composite video signal from an external apparatus such as a television tuner is to be displayed on the picture tube, it is necessary to prepare within the apparatus a continuous wave in synchronism with a burst signal included in the external signal. Therefore, like in the case of the embodiment shown in FIG. 1, a desired signal is obtained by controlling the reference signal oscillator 44 with the APC circuit 47.

As described in the foregoing, in accordance with this invention, the reference signal oscillator for processing the chrominance signal is arranged to be usable also for processing a chrominance signal coming from some other apparatus. The arrangement permits reduction in the number of necessary parts and simplification of the circuit arrangement. It is another advantage of this invention that the chrominance signal can be prevented from being deteriorated by a difference between reference signals to be used for the two signal processing operations performed on the chrominance signal.

What is claimed is:

1. A color video signal recording and/or reproducing apparatus comprising:
   (a) a recording and/or reproducing part which records and/or reproduces a color video signal, said part including a frequency conversion circuit for converting a carrier frequency of a carrier chrominance signal included in said color video signal;
   (b) a coupled part which is functionally coupled with said recording and/or reproducing part and performs a function other than recording and reproduction, said coupled part including a signal processing circuit for processing said carrier chrominance signal; and
   (c) reference signal generating means which includes, an oscillation circuit arranged to produce an oscillation signal, a first frequency divider arranged to frequency divide said oscillation signal for producing a first reference signal which is used in said frequency conversion circuit and said signal processing circuit and has the same frequency as the color subcarrier frequency, and a second frequency divider arranged to frequency divide said oscillation signal for producing a second reference signal which has the same frequency as the carrier frequency of said carrier chrominance signal converted by said frequency conversion circuit, wherein said frequency conversion circuit includes a first balanced modulator which is arranged to perform a balanced modulating action on said first reference signal and said second reference signal and a second balanced modulator which is arranged to perform a balanced modulating action on an output signal of said first balanced modulator and said carrier chrominance signal.

2. An apparatus according to claim 1, wherein said reference signal generating means further includes a third frequency divider arranged to frequency divide said oscillation signal for producing a third reference signal which is used in said coupled part and has the same frequency as the horizontal synchronizing frequency of said color video signal.

3. An apparatus according to claim 1, wherein said coupled part includes an image pickup part arranged to convert an optical image into said color video signal.

4. A color video signal recording apparatus, comprising:
   (a) an image pickup part arranged to convert an optical image into a color video signal, said image pick up part including color difference signal generating means for generating color difference signal corresponding to said optical image and a color modulation circuit which is arranged to form a carrier chrominance signal by modulating said color difference signals;
   (b) a recording part arranged to record said color video signal produced by said image pickup part, said recording part including a frequency conversion circuit which is arranged to convert the carrier frequency of said carrier chrominance signal; and (c) reference signal generating means which includes, an oscillation circuit arranged to produce an oscillation signal, a first frequency divider arranged to frequency divide said oscillation signal for producing a first reference signal which is used in said frequency conversion circuit and said color modulation circuit and has the same frequency as the color subcarrier frequency, and a second frequency divider arranged to frequency divide said oscillation signal for producing a second reference signal which has the same frequency as the carrier frequency of said carrier chrominance signal converted by said frequency conversion circuit, wherein said frequency conversion circuit includes a first balanced modulator which is arranged to perform a balanced modulating action on said first reference signal and said second reference signal and a second balanced modulator which is arranged to perform a balanced modulating action on an output signal of said first balanced modulator and said carrier chrominance signal.

5. An apparatus according to claim 4, wherein said reference signal generating means further includes a third frequency divider arranged to frequency divide said oscillation signal for producing a third reference signal which is used in said image pick up part and has the same frequency as the horizontal synchronizing frequency of said color video signal.

* * * * *